Patented July 13, 1948

2,445,191

UNITED STATES PATENT OFFICE 2,445,191

MIXED POLYSULFIDE CONDENSATION PRODUCT AND METHOD OF MAKING

Theodore A. Te Grotenhuis, Olmsted Falls, Ohio, and Gilbert Holm Swart, Wabash, Ind., assignors to The General Tire & Rubber Company, Akron, Ohio, a corporation of Ohio No Drawing. Application February 17, 1943, Serial No. 476,214

6 Claims. (Cl. 260—79)

This invention relates to the production of a synthetic rubberlike material. It particularly relates to a rubbery reaction product of saturated and unsaturated organic compounds with inorganic polysulfides.

Rubberlike reaction products of alkaline polysulfides and either saturated or unsaturated organic compounds having two carbon atoms with a substituent capable of being split off during the reaction have heretofore been proposed and manufactured. Those condensation products of alkaline polysulfides with saturated organic compounds such as alkylene dihalides, e. g., ethylene dichloride, propylene chloride, or with dichloro-ethers are extremely resistant to chemicals, solvents and aromatic oils but have relatively low tensile strength, elasticity and abrasion resistance. They are especially undesirable for several uses because they have poor resistance to cold flow and only fair vulcanizability and general workability, as distinguished from some of the other commercial synthetic rubbers. Those reaction products of unsaturated dihalides with alkaline polysulfides have less resistance to chemicals and the like, probably because of the presence of the double bonds within each unit of the rubbery polymer.

It is an object of the present invention to provide a vulcanizable rubbery reaction product or condensation product of alkaline polysulfides and organic compounds, which product is extremely resistant to light, chemicals and the like but has less tendency for cold flow than have the reaction products of saturated compounds, such as olefin dihalides and alkaline polysulfides heretofore prepared.

It is another object of the present invention to provide a rubbery material which may be formed and cured or vulcanized to produce articles having good resistance to cold flow and high resistance to chemicals, light and the like.

It is another object of the present invention to produce a rubbery reaction product of one or more polysulfides with one or more organic materials having high resistance to cold flow, light and chemicals and having good vulcanizability.

It is a still further object of the present invention to provide a rubbery product and a method of making a rubbery product utilizing an inorganic polysulfide, which product has high resistance both to chemicals as well as to cold flow.

Other objects will be apparent from the following description of the invention.

In accordance with the present invention, rubberlike polymers of improved resistance to cold flow after vulcanization are obtained by reacting an alkaline polysulfide, which has at least two and preferably about three to five sulfur atoms per molecule, with a mixture of one or more saturated and one or more unsaturated organic compounds. The saturated compounds are present in major proportion and have two, and preferably only two, substituents which are capable of being split off during the reaction connected to different connected carbons. The unsaturated or substituted compounds are present in only minor proportions to provide for cross linkage during vulcanization either with sulfur or with agents effecting cross linkage between said substituted groups. Since the carbon-to-carbon double bonds and said substituents are apparently in large measure saturated or reacted during vulcanization, there is no appreciable or noticeable decrease in chemical resistance of the rubbery material. The unsaturated compounds also preferably contain two substituents of the types which are split off during the reaction.

The amount of unsaturated compound should preferably be less than the amount of saturated compound and the more desirable amounts vary with the molecular length or molecular weight of the compound, exclusive of substituents, and with the number of double bonds in the molecule. To materially decrease cold flow the proportion of unsaturated to saturated material should be chosen so that at least one aliphatic double bond is present for each 400 or 500-chain carbon atoms in the final unvulcanized rubberlike molecules and as much as one carbon-to-carbon double bond for each 15 carbons may be used, although at the higher unsaturation, resistance to chemicals is already somewhat less. Preferably, the amounts of unsaturated and saturated compounds are chosen so that there is one carbon-to-carbon double bond for each 100 to 300 carbon atoms in order that most of the double bonds may be saturated by subsequent vulcanization and chemical resistance of the polymer will not be appreciably impaired.

It is desirable that the unsaturated and saturated compounds be co-miscible or co-soluble in the proportions used and that both compounds have some solubility in the aqueous media containing the inorganic polysulfide. For best results the saturated and unsaturated materials should have solubilities in the aqueous media containing the inorganic polysulfide in about the proportions of their concentrations in the mixture, so that reactivity of the saturated and unsaturated compounds will be more nearly related to their concentration and a relatively uniform distribution of the unsaturated groups will occur within the rubber molecules. When the unsaturated compound is insufficiently soluble in water, the solubility may be adjusted to the required magnitude by incorporating varying amounts of a mutually miscible solvent, such for example as a lower alcohol, ketone, etc., with the di-substituted materials.

Desirable unsaturated compounds include the dihalogen alkenes, such for example as the dichloropropylenes (epidichlorohydrins, allylene dichloride), dichloroethylene, butadiene dichloride, and homologues of dichloro and dibromo propylenes having substituents attached to different carbon atoms, which are split off during the reaction with the alkaline polysulfides.

When workability is a controlling factor, it is often desirable to utilize a small amount of a mono-substituted unsaturated compound such as allyl chloride, chloroprene, etc., which tends to limit molecular length of the polymer prior to vulcanization but improves vulcanizability with sulfur as the double bond permits the formation of useful final products.

The saturated compounds which preferably furnish the major portion of the hydrogen and carbon in the rubbery polymers of the present invention may be: an olefin dihalide, e. g., ethylene propylene or butylene chloride or bromide; a disubstituted ether, e. g., beta-beta'-dichlorodiethylether; or other saturated compounds containing a halogen or other substituent attached to different carbon atoms, which substituent is split off by reaction with the polysulfide.

The alkaline polysulfide which is usually used for reaction with halogen substituted compounds may be prepared in any suitable way, as by boiling a slurry of lime or alkali metal hydroxide for several hours with sufficient sulfur to form a polysulfide of at least four atoms to the molecule; by fusing sulfur with disodium sulfide, etc. The higher sulfur concentration tends, upon reaction with the organic constituents, to form the softer rubberlike products.

The products produced as herein described are, after removal of impurities, masticated with carbon black, vulcanizing agents such as zinc oxide and a suitable amount of organic accelerator, which is preferably of a type capable of producing vulcanization in rubber without the separate addition of sulfur, although common organic accelerators will facilitate the cross linking of molecules between the double bonds and the sulfur normally present to substantially eliminate cold flow of the vulcanized product. Additional sulfur and other compounding ingredients may, however, be added as usually practiced in the art.

The following example illustrates the present invention:

*Example*

500 grams of hydrated sodium sulfide are dissolved in about 1 liter of water and the solution boiled with 200 grams of sulfur. The polysulfide formed, which has the formula $Na_2S_{4-5}$, is diluted with water to have a specific gravity of about 1.25. About 250 grams of ethylene dichloride and about 6 or 7 grams of butadiene dichloride are intimately mixed with about 100 grams of ethyl alcohol to increase the water-solubility of the butadiene dichloride and the mixture is gradually added with vigorous stirring. This mixture is heated at about 70 or 80° C. in a vessel having a reflux condenser, the reaction being completed in about two hours. The plastic product remaining after the withdrawal of the liquid is washed with water. After drying, it is mixed with 60 parts of carbon black (based on 100 parts of the rubber plastic), about 8 parts of zinc oxide, 3 parts of sulfur, one part of stearic acid and 1½ parts of benzothiazyldisulfide. The compounded material when cured has substantially no tendency for cold flow and has excellent resistance to chemicals.

Furthermore, it is to be understood that the particular form of product shown and described and the particular procedure set forth are presented for purposes of explanation and illustration and that various modifications of said product and procedure can be made without departing from our invention as defined in the appended claims.

What we claim is:

1. A method of preparing a vulcanizable condensation product which comprises reacting in the presence of water with a water-soluble, inorganic alkaline polysulfide a mixture of ethylene dichloride and butadiene dichloride, said butadiene dichloride and said ethylene dichloride being proportioned to provide in the reaction mixture between 15 and 500 carbon atoms based on the original reactants in said mixture for each unsaturated group, said butadiene dichloride and said ethylene dichloride being reacted with said polysulfide in the presence of each other and in the presence of ethyl alcohol, whereby said condensation product is formed having unsaturated linkages provided by said butadiene dichloride distributed through the polymer chain in sufficient amounts for cross-linking by vulcanizing agents to eliminate cold flow but in insufficient amounts to materially reduce the chemical resistance of the product.

2. The method of forming a plastic condensation product of an alkaline polysulfide and a compatible disubstituted organic compound, said method comprising reacting with a water-soluble, inorganic alkaline polysulfide and with an aliphatic hydrocarbon organic compound containing an olefinic linkage, a saturated aliphatic organic compound selected from the group consisting of hydrocarbon compounds and aliphatic ethers, said organic compounds being reacted in the presence of each other and in the presence of water, each of said organic compounds containing as the two substituents two chlorine atoms, each of which is connected to a different aliphatic carbon atom of the compound, said olefinic compound and said saturated compound being compatible with each other and being proportioned to provide one olefinic group for each 15 to 500 carbon atoms of said mixture of organic compounds, whereby olefinic groups are distributed through the condensation product in sufficient amount to permit vulcanization to eliminate cold flow by reacting with vulcanizing agents but in insufficient amounts to materially reduce the chemical resistance of the product after such vulcanization.

3. A method of making a plastic condensation product of an alkaline polysulfide and compatible organic dihalides, said method comprising reacting with a water-soluble, inorganic polysulfide a saturated aliphatic hydrocarbon dihalide containing linked to each of two different carbon atoms a halogen group which is split off by reaction with an alkaline polysulfide, and an aliphatic hydrocarbon dihalide, containing an olefinic linkage and having attached to each of two carbon atoms a halogen atom split off by reacting with an alkaline polysulfide, said organic compounds being compatible with each other and being reacted in the presence of each other and in the presence of water, and being mixed together prior to the reaction, the amount of said organic compound containing an olefinic linkage being proportioned to the amount of said saturated organic compound to provide only one olefinic linkage for 100 to 300 carbon atoms in the compounds of said mixture, whereby the condensation product formed has sufficient olefinic groups to provide for vulcanization but insufficient olefinic groups to materially detract from chemical resistance of the composition as compared to the chemical resistance of the condensation product prepared from the alkaline polysulfide and the saturated organic compound alone.

4. The method of claim 2 wherein the polysulfide and said organic compounds are reacted together in the presence of an alcohol compatible with the inorganic polysulfide solution.

5. A product of the process of claim 1.
6. A product of the process of claim 2.

THEODORE A. TE GROTENHUIS.
GILBERT HOLM SWART.

REFERENCES CITED

The following references are of record in the file of this patent:

UNITED STATES PATENTS

| Number | Name | Date |
|---|---|---|
| 2,026,875 | Ellis et al. | Jan. 7, 1936 |
| 2,056,026 | Twiss | Sept. 29, 1936 |
| 2,166,507 | Schroter | July 18, 1939 |
| 2,347,840 | Nygaard | May 2, 1944 |
| 2,363,614 | Patrick | Nov. 28, 1944 |
| 2,363,615 | Patrick | Nov. 28, 1944 |

FOREIGN PATENTS

| Number | Country | Date |
|---|---|---|
| 298,889 | Great Britain | June 6, 1929 |
| 510,666 | Great Britain | Aug. 4, 1939 |